(12) United States Patent
Fisher

(10) Patent No.: US 7,690,951 B2
(45) Date of Patent: Apr. 6, 2010

(54) BALLAST MOUNTED CONNECTOR RECEPTACLE

(75) Inventor: Seth Fisher, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/169,228

(22) Filed: Jul. 8, 2008

(65) Prior Publication Data

US 2010/0009577 A1   Jan. 14, 2010

(51) Int. Cl.
*H01R 33/00* (2006.01)

(52) U.S. Cl. ...................................... 439/682

(58) Field of Classification Search .............. 439/682, 439/475, 752, 595–596; 29/842
See application file for complete search history.

(56) References Cited

U.S. PATENT DOCUMENTS

| | | |
|---|---|---|
| 4,729,740 A | 3/1988 | Crowe et al. |
| 5,023,520 A | 6/1991 | Costa |
| 5,148,086 A | 9/1992 | Costa |
| 5,181,865 A * | 1/1993 | Hayes, Sr. .................. 439/752 |
| 5,350,292 A | 9/1994 | Sanders et al. |
| 5,488,268 A | 1/1996 | Bauer et al. |
| 5,720,546 A | 2/1998 | Correll, Jr. et al. |
| 5,762,509 A | 6/1998 | Kang |
| 5,919,061 A | 7/1999 | Wozniczka et al. |
| 5,931,696 A | 8/1999 | Wozniczka et al. |
| 5,967,838 A | 10/1999 | Wozniczka et al. |
| 6,176,655 B1 | 1/2001 | Ostermeier et al. |
| 2007/0059973 A1 | 3/2007 | Fabian et al. |

FOREIGN PATENT DOCUMENTS

| | | |
|---|---|---|
| DE | 195 04 112 | 8/1996 |
| DE | 195 04 112 A1 | 8/1996 |
| DE | 10 2005 016 533 A1 | 10/2006 |
| WO | WO 98/26634 | 6/1998 |

OTHER PUBLICATIONS

International Search Report, International Application No. PCT/US2009/003985, International Filing Date, Aug. 7, 2009.

* cited by examiner

*Primary Examiner*—Jean F Duverne

(57) ABSTRACT

A connector, method of connecting, and connector assembly preventing potting from disrupting the physical and electrical connection of a mated electrical connector assembly that can be connected and/or disconnected without cutting wires and with a single hand.

23 Claims, 9 Drawing Sheets

BALLAST MOUNTED CONNECTOR RECEPTACLE

FIELD OF THE INVENTION

The present invention is directed to an electrical connector assembly. In particular, the present invention is directed to an electrical connector and conductor connecting method that prevents potting from disrupting the physical and electrical connection of a mated electrical connector assembly.

BACKGROUND OF THE INVENTION

Connector assemblies typically include a plug connector having a plug housing containing pin contacts mated to a receptacle connector having a receptacle housing containing socket contacts. The plug housing and the receptacle housing are physically mated, which physically and electrically connect the pin and socket contacts to form an electrical connection.

Such connectors are used for fluorescent ballast light applications. In these application, a plug connector and a receptacle connector are mated by use of tools and/or require more than one hand. The use of tools and/or multiple hands is inconvenient and undesirable.

Upon being mated, these connectors may be contained within a ballast box. Often, a fluid which converts into a foam or solid is introduced into these boxes as potting. This foam or solid prevents the mated connectors from being separated without cutting the wires.

Therefore, there is an unmet need to provide a connector and connecting method that allows the physical and electrical connection of a mated electrical connector assembly to occur outside of the potting region and can be connected and/or disconnected without cutting wires that does not require tools and may be connected and/or disconnected with a single hand.

SUMMARY OF THE INVENTION

This invention provides a connector and method of connecting that prevents potting from disrupting the physical and electrical connection of a mated electrical connector assembly but can be connected and/or disconnected without cutting wires and with a single hand.

According to an embodiment, a connector including a housing including a potting shield, at least one conductor configured to extend through the housing, and wherein the housing is configured to be mounted to a PCB, the PCB being configured to be positioned in a ballast, thereby permitting the at least one conductor to extend through the PCB and through the ballast is disclosed.

According to another embodiment, a conductor connecting method including providing a connector including a housing with a potting shield, at least one conductor configured to extend through the housing, and wherein the housing is configured to be mounted to a PCB which is configured to be positioned in a ballast thereby permitting the at least one conductor to extend through the PCB and through the ballast is disclosed.

According to another embodiment, a connector assembly including a housing including a potting shield, at least one conductor configured to extend through the housing, a corresponding connector, and a PCB configured to be positioned in a ballast, wherein the housing is configured to be mounted to the PCB thereby permitting the at least one conductor to extend through the PCB and through the ballast is disclosed.

An advantage of the present invention is a connector and connecting method that can be connected and/or disconnected without cutting wires.

A further advantage of the present invention is a connector and connecting method that does not require tools and may be connected and/or disconnected with a single hand.

A further advantage of the present invention is a connector and connecting method that prevents fluid and/or foam from disrupting the physical and electrical connection of a mated electrical connector assembly.

A further advantage of the present invention is a connector and connecting method that provides a safe means of replacing florescent ballasts in the event of a failure.

Further aspects of the method and system are disclosed herein. The features as discussed above, as well as other features and advantages of the present invention will be appreciated and understood by those skilled in the art from the following detailed description and drawings.

BRIEF DESCRIPTION OF THE DRAWINGS

Wherever possible, the same reference numbers will be used throughout the drawings to represent the same parts.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
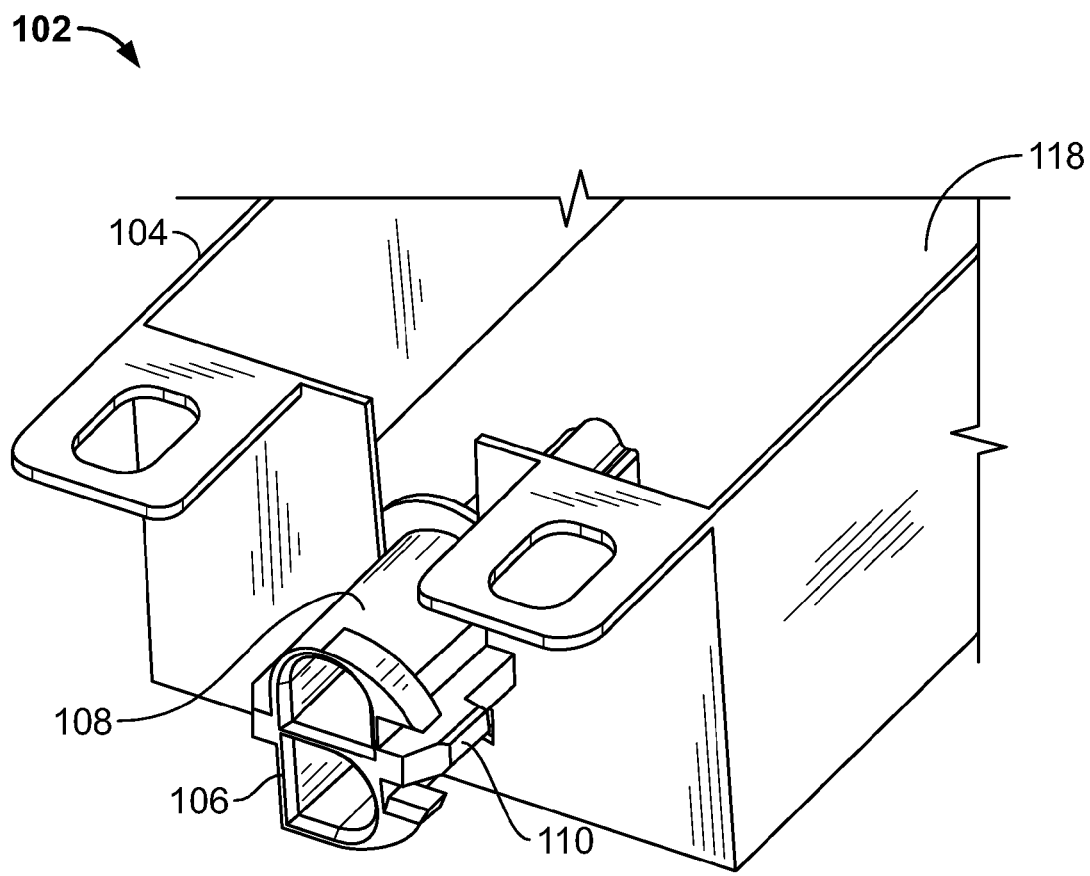
FIG. 1 illustrates a top perspective view of an exemplary embodiment of a connector mounted in a ballast.
Figure 2:
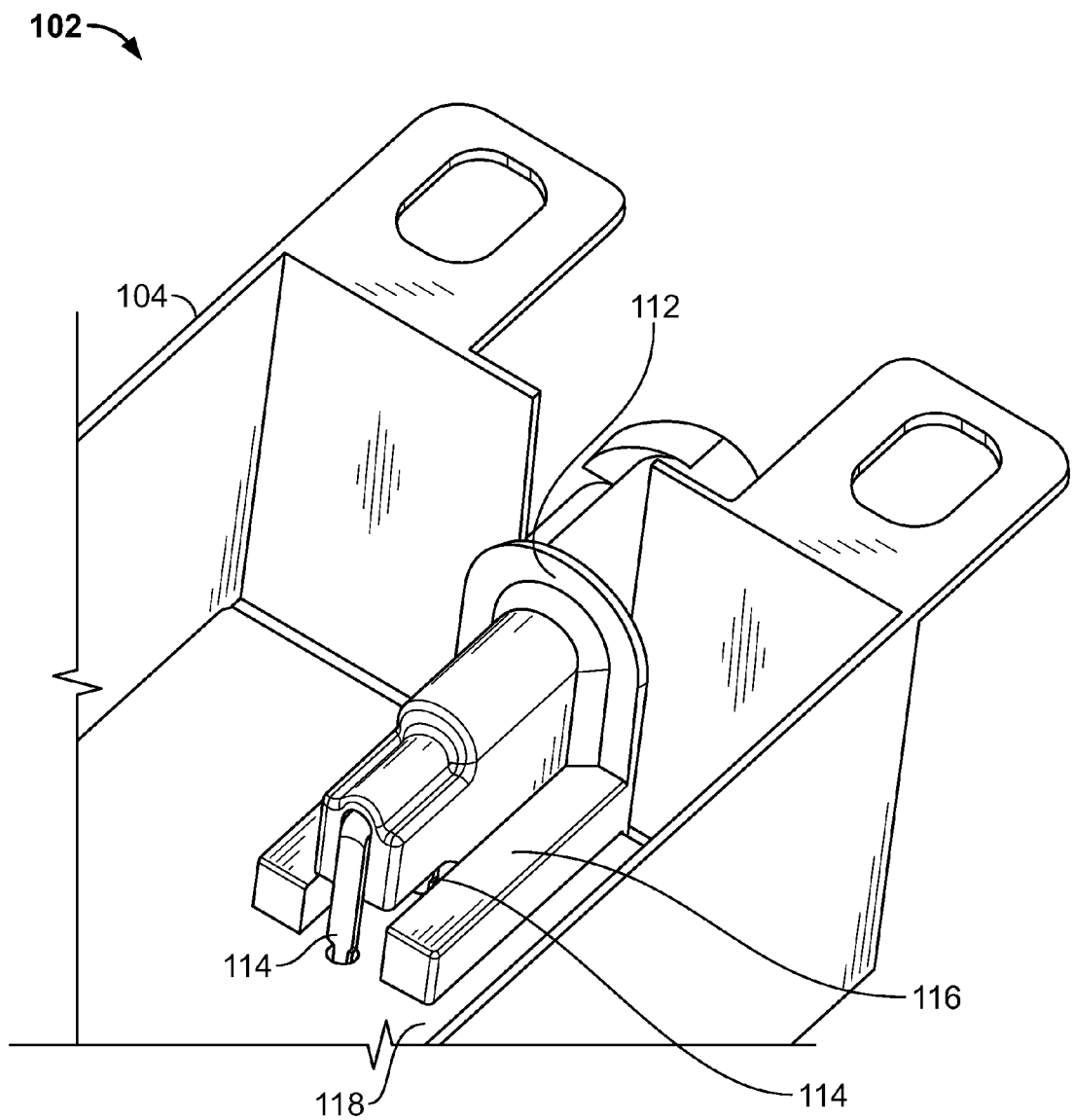
FIG. 2 illustrates a top reverse perspective view of the embodiment illustrated in FIG. 1.

FIGS. 1 and 2 illustrate an exemplary embodiment of a connector 102 positioned in a ballast 104. As shown in FIG. 1, the connector 102 includes a receptacle end 106, a housing 108, and a latching mechanism 110. As shown in FIG. 2, the connector 102 further includes a potting shield 112, at least one conductor 114, and a stabilizing member 116. The embodiment illustrated in FIGS. 1 and 2 also depicts the connector 102 being mounted to a printed circuit board ("PCB") 118.

In the embodiment illustrated in FIGS. 1 and 2, the connector 102 is positioned within the ballast 104 on top of a PCB 118. The receptacle end 106 of the connector 102 extends from within the ballast 104 to outside of the ballast 104. This receptacle end 106 of the connector 102 is specifically configured to mate with existing connectors. Specifically, this connector is configured to mate with a connector such as the connector disclosed in U.S. patent application Ser. No. 11/555,941, filed Nov. 2, 2006, which is incorporated by reference in its entirety.

The housing 108 of the connector 102 is depicted in the embodiments illustrated by FIGS. 1 and 2 as a polyamide molded housing. In other embodiments, other hard and non-conductive plastics, as would be understood by those skilled in the art, are used to create the housing 108. In the embodiment illustrated in FIGS. 1 and 2, the housing 108 is one integral piece but, in other embodiments, includes multiple pieces affixed to each other.

Figure 3:
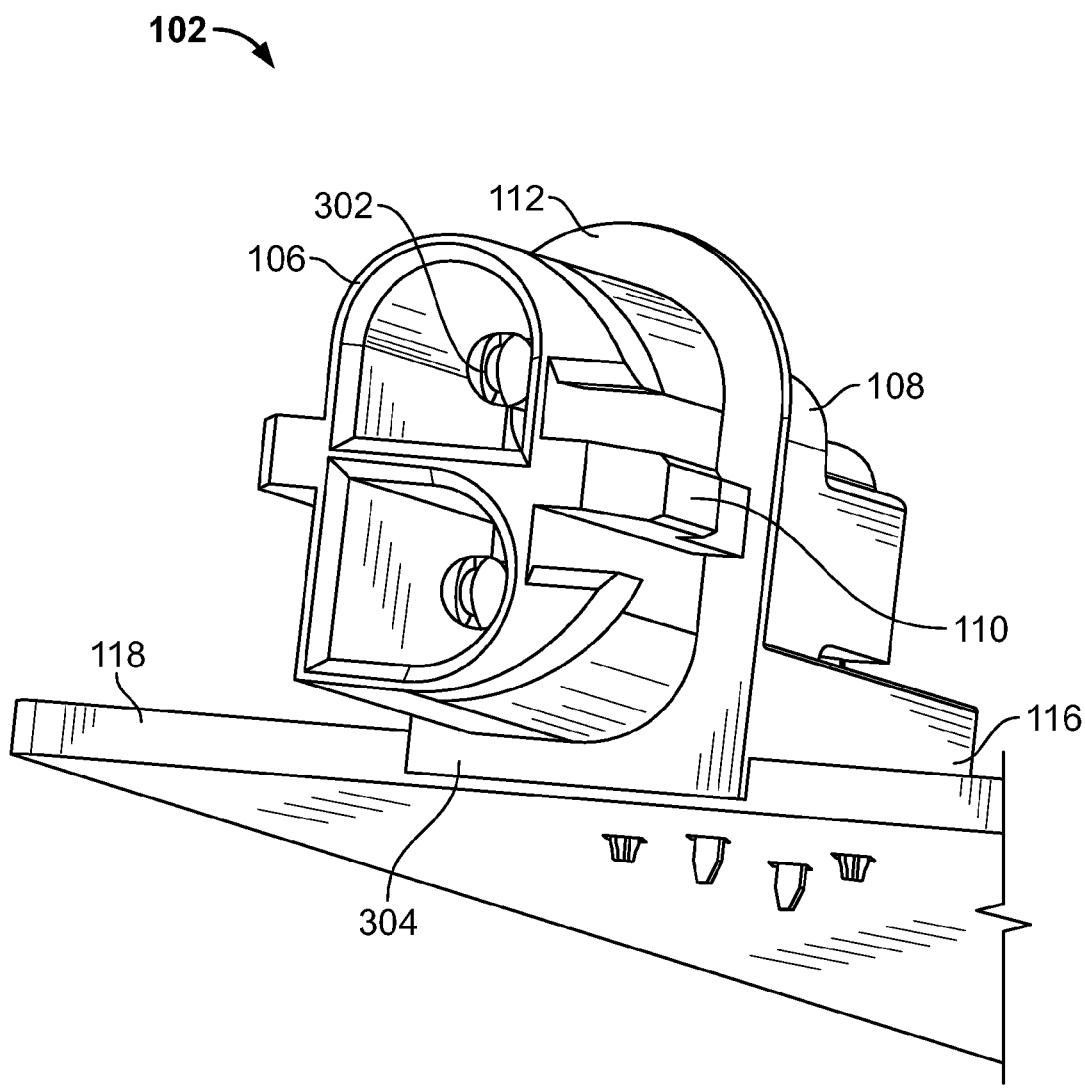
FIG. 3 illustrates a bottom perspective view of an exemplary embodiment of a connector mounted to a PCB.

The potting shield 112 is a flange-like structure extending around the exterior portion of the housing 108 of the connector 102. The potting shield 112 is specifically configured to abut the wall 120 of the ballast 104. As seen in FIG. 3, the potting shield 112 includes a substantially planar bottom surface 304 acting as an aligning edge and as a guiding means. In the embodiment illustrated in FIGS. 1 and 2, the potting shield 112 is depicted as having a semi-circular top surface 122. In another embodiment, a grommet may be included to seal any openings where potting could escape. In other embodiments, the potting shield 112 includes a substantially planar top surface. In one embodiment, the potting shield 112 includes a top surface that becomes flush with the top surface of the ballast 124 when the connector 102 is fully inserted in the ballast 104.

The potting shield 112 is configured to act as a physical barrier preventing potting inserted into the ballast 104 from exiting out of the ballast 104. Potting is a substance used in a process of filling a complete electronic assembly with a compound that is solid or becomes solid. The potting is used for resistance to shock, resistance to vibration, and exclusion of moisture and corrosive agents. Often, thermosetting plastics are used as potting. The potting shield 112 is further configured to serve as a locating device for the ballast 104 and the PCB 118.

The embodiment illustrated in FIG. 2 depicts the at least one conductor 114. The embodiment depicted includes a second conductor 114 housed between the stabilizing members 116 beneath the housing 108 of the connector 102. The at least one conductor 114 extends through the PCB 118 on one end and through the housing 108 to the receptacle end 106 of the connector 102 where the conductor 114 is in electrical communication with the at least one contact 302 which is configured to mate with a corresponding connector.

As depicted in the embodiment illustrated in FIGS. 1 and 2, the stabilizing member 116 is a horizontal member of cuboid geometry configured to abut the PCB 118 and act as a means of preventing the connector 102 from becoming dislodged. In the embodiment illustrated by FIGS. 1 and 2, there are two stabilizing members 116 located on opposite sides of the connector 102 within the ballast 104. The stabilizing members 116 are depicted as integral with the housing 108 of the connector 102. In other embodiments, the stabilizing members 116 are separate from the connector 102 and attached to the connector 102. In FIGS. 1 and 2, the stabilizing members 116 are depicted as the same material as the connector 102. In other embodiments, the stabilizing member 116 are comprised of different materials. Another function of the stabilizing member 116 is that the stabilizing members 116 partially protect the conductor 114 from being damaged. The stabilizing members 116 provide this protection by acting as a physical barrier between the conductor 114 and the areas surrounding the connector 102. The stabilizing members 116 also provide features permitting board locks 602 to be inserted into the stabilizing member 116 thereby securing the connector to the PCB 118 prior to soldering or other affixing.

FIG. 3 illustrates an exemplary embodiment of a connector 102 mounted to a PCB 118. As depicted in FIG. 3, the receptacle end 106 of the connector 102 is specifically configured to mate with corresponding connectors by means of the latching mechanism 110. The receptacle end 106 includes at least one opening arranged and disposed within the receptacle end 106 to permit a contact 302 to be housed within the housing 108. In the embodiment illustrated in FIG. 3, the receptacle end 106 includes two contacts 302. In other embodiments, more or fewer contacts 302 are included. The contact 302 in the embodiment illustrated in FIG. 3 is comprised of copper alloy tin plating over a nickel inside. As will be understood by those skilled in the art, in other embodiments, the contact 302 material may be comprised of other conductive materials.

The embodiment illustrated in FIG. 3 also depicts the substantially planar bottom surface 304 of the potting shield 112. The substantially planar back surface 304 is an embodiment of the aligning edge providing location for proper placement of the connector 102 in relation to the PCB 118. In the embodiment illustrated in FIG. 3, the flat bottom surface 304 is integral with the potting shield 112. In another embodiment the potting shield 112 is a separate piece that is configured to be attached to the housing 108. In yet another embodiment, the potting shield 112 is directly attached to the ballast 104 thereby permitting the connector 102 to be inserted into the potting shield 112.

As illustrated in the embodiment of the connector 102 in FIG. 3, the connector 102 further includes surface mounted hold-downs 306. The surface mounted hold-downs 306 extend from the stabilizing members 116 of the housing 108 of the connector 102 through the PCB 118. As illustrated in FIG. 3, in one embodiment, the surface mounted hold-downs 306 protrude through the PCB 118 permitting the surface mounted hold-downs to be soldered, welded, or flattened thereby affixing the connector 102 to the PCB 118.

Figure 4:
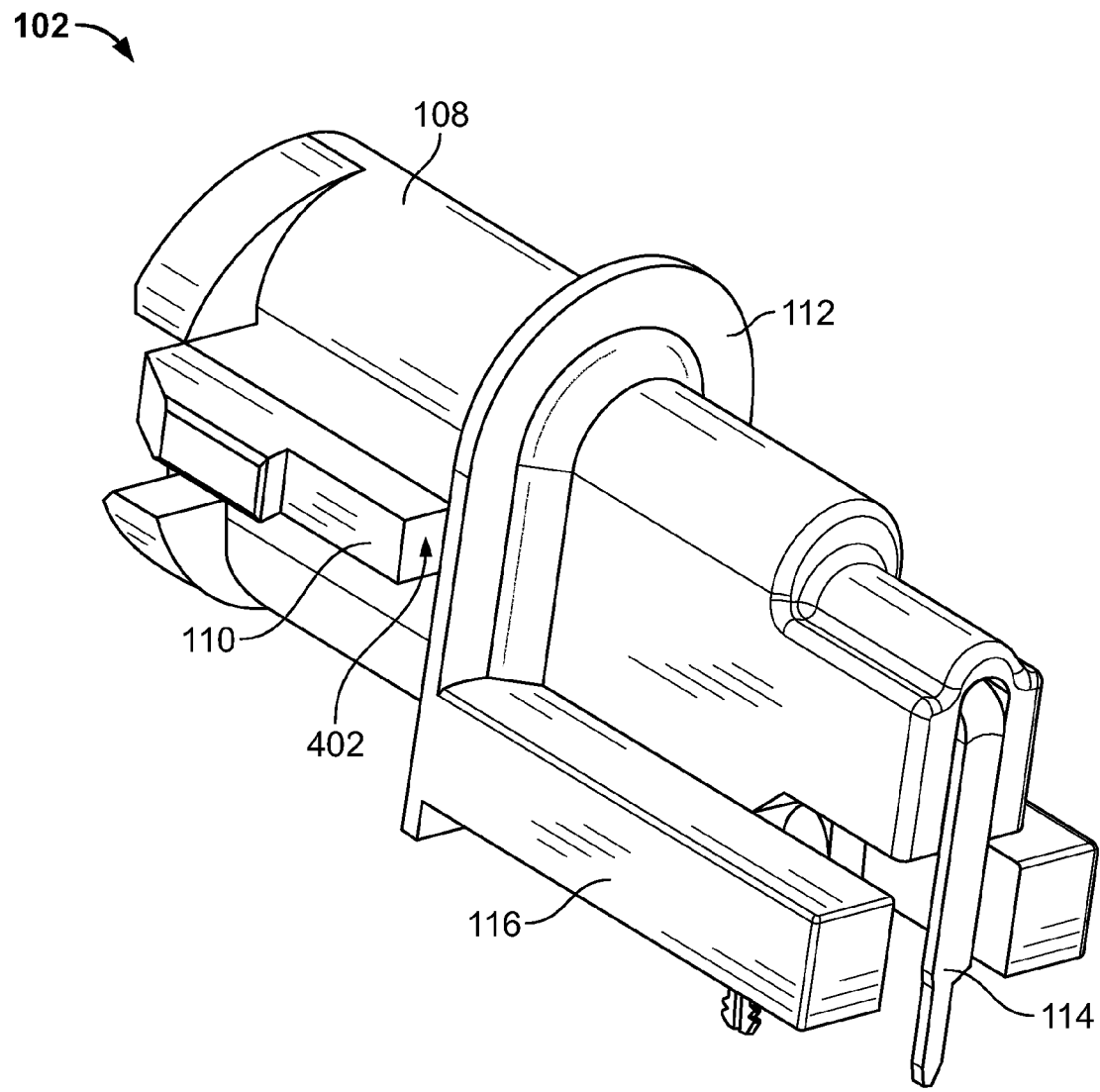
FIG. 4 illustrates a perspective view of an exemplary embodiment of a connector.
Figure 5:
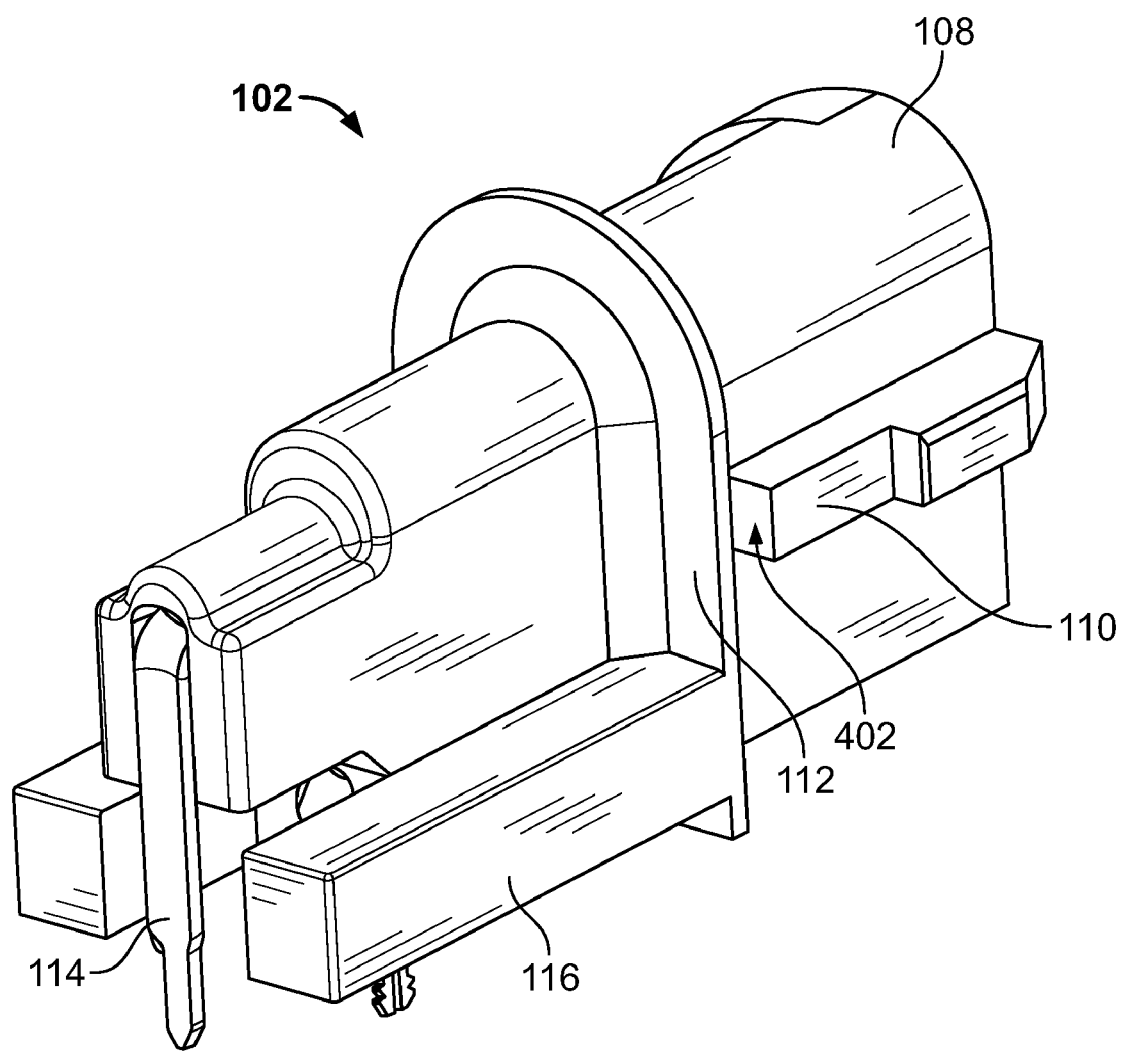
FIG. 5 illustrates a reverse perspective view of the other side of the embodiment in FIG. 4.

FIGS. 4 and 5 illustrate an exemplary embodiment of a connector 102. In FIGS. 4 and 5, the latching mechanism 110 is depicted as separate from the potting shield 112. The distance of a slot 402 between the latching mechanism 110 and the potting shield 112 corresponds to the thickness of the wall 120 on the ballast 104 (shown in FIG. 1). In the embodiment illustrated in FIGS. 4 and 5, the slot 402 is slightly larger than the thickness of the wall 120 (shown in FIG. 1). In another embodiment, the latching mechanism 110 is attached to the potting shield 112 but the potting shield 112 extends further from the housing 108 than the latching mechanism 110 thereby permitting the latching mechanism 110 to abut the wall 120 of the ballast 104 (shown in FIG. 1) while permitting the potting shield 112 to act as a physical barrier surrounding the interface between the ballast 104 and the connector 102.

Figure 6:
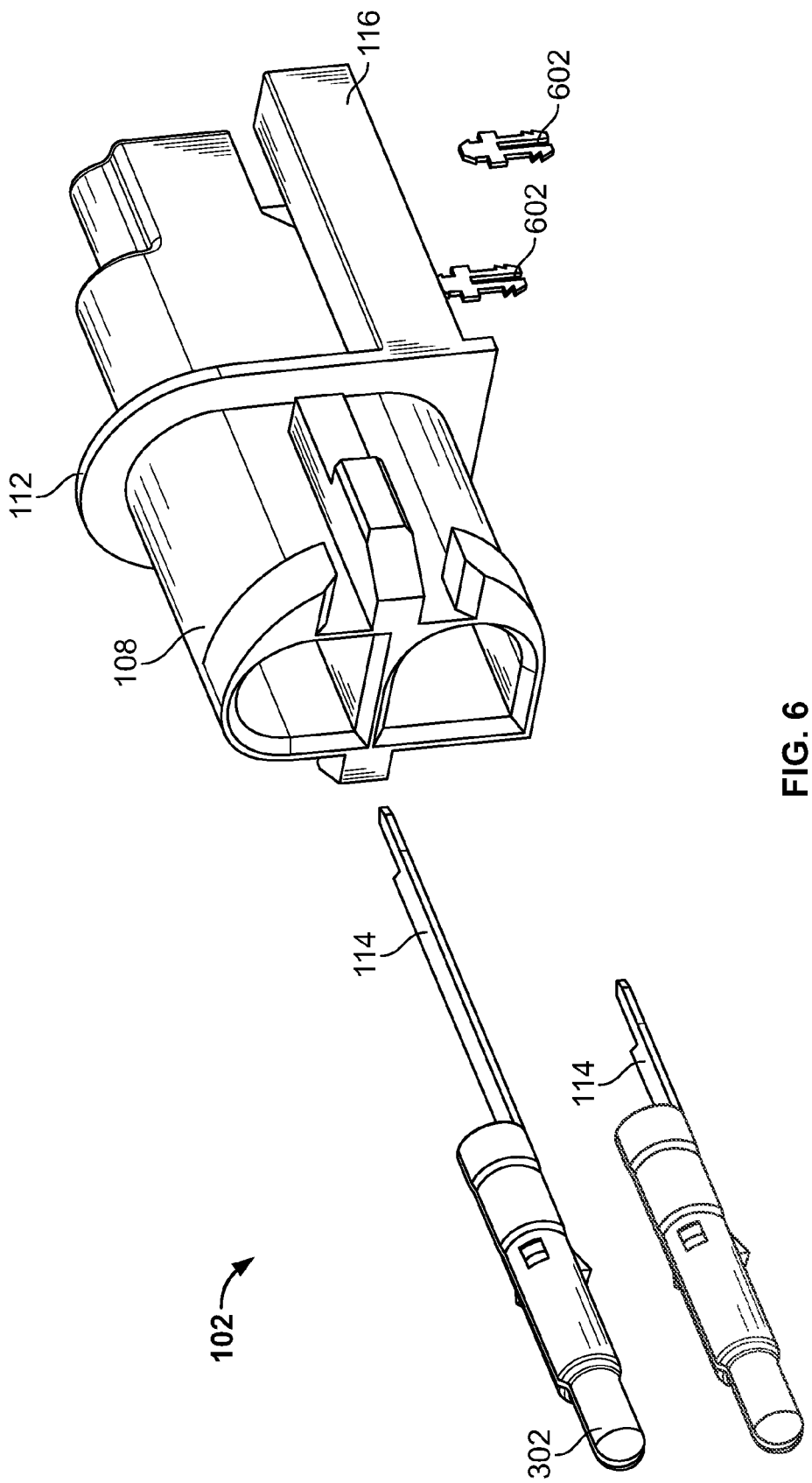
FIG. 6 illustrates an exploded perspective view of an exemplary embodiment of a connector.

FIG. 6 illustrates an exploded perspective view of an exemplary embodiment of a connector 102. In FIG. 6, the stabilizing member 116 is depicted as configured to permit a board lock 602 to be inserted into the stabilizing member 116. The board lock 602 is configured to be inserted into the PCB 118 (not shown in FIG. 6). The board lock 602 permits the connector 102 to be secured upon being positioned in the ballast 104 and/or on the PCB 118. The board locks 602 also act as a guide for positioning the connector 102 properly on the PCB 118. In the embodiment illustrated in FIG. 6, the board locks 602 also act as the surface mounted hold-downs 306. In other embodiments, the board locks 602 are separate from the surface mounted hold-downs 306.

The embodiment illustrated in FIG. 6 also depicts the contacts 302 removed from the receptacle end 106. In the embodiment illustrated, the contacts 302 are in electrical communication with the conductor 114. The conductor 114 illustrated in FIG. 6 are the same conductor 114 that extend through the housing 108 of the connector 102 where they bend and then extend between the stabilizing members 116 and through the PCB 118. Those skilled in the art will understand that the contacts 302 can be replaced with sockets corresponding to contacts on another connector.

Figure 7:
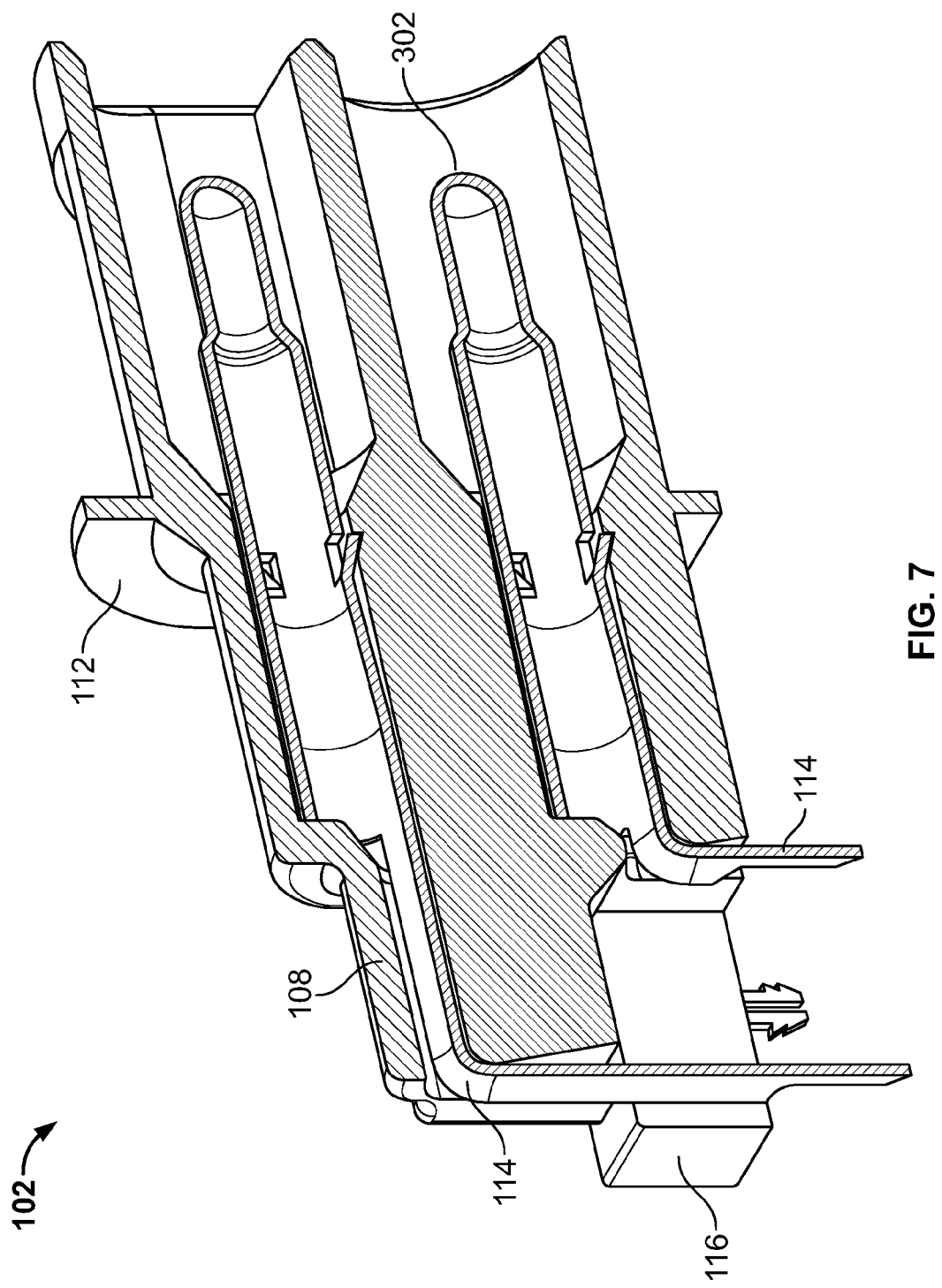
FIG. 7 illustrates a sectioned view of an exemplary embodiment of a connector.

FIG. 7 illustrates a sectioned view of an exemplary embodiment of a connector 102 along a central axis. The sectioned view illustrates the conductor 114 extending through the housing 108. As a sectioned view along a central axis, FIG. 7 only shows one stabilizing member 116; however, in the embodiment depicted in FIG. 7, two stabilizing members 116 are included.

Figure 8:
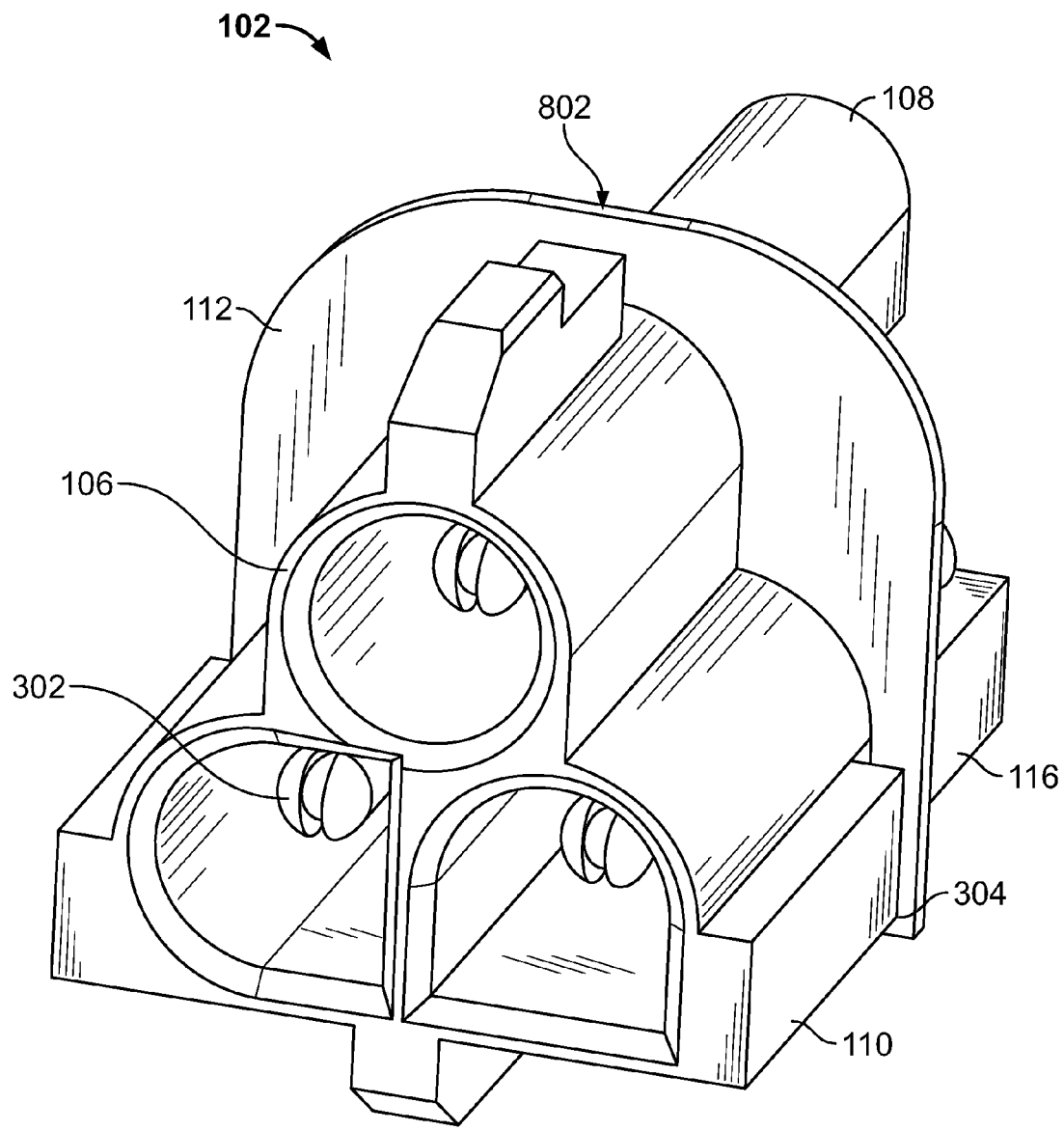
FIG. 8 illustrates a top perspective view of an exemplary embodiment of a connector.
Figure 9:
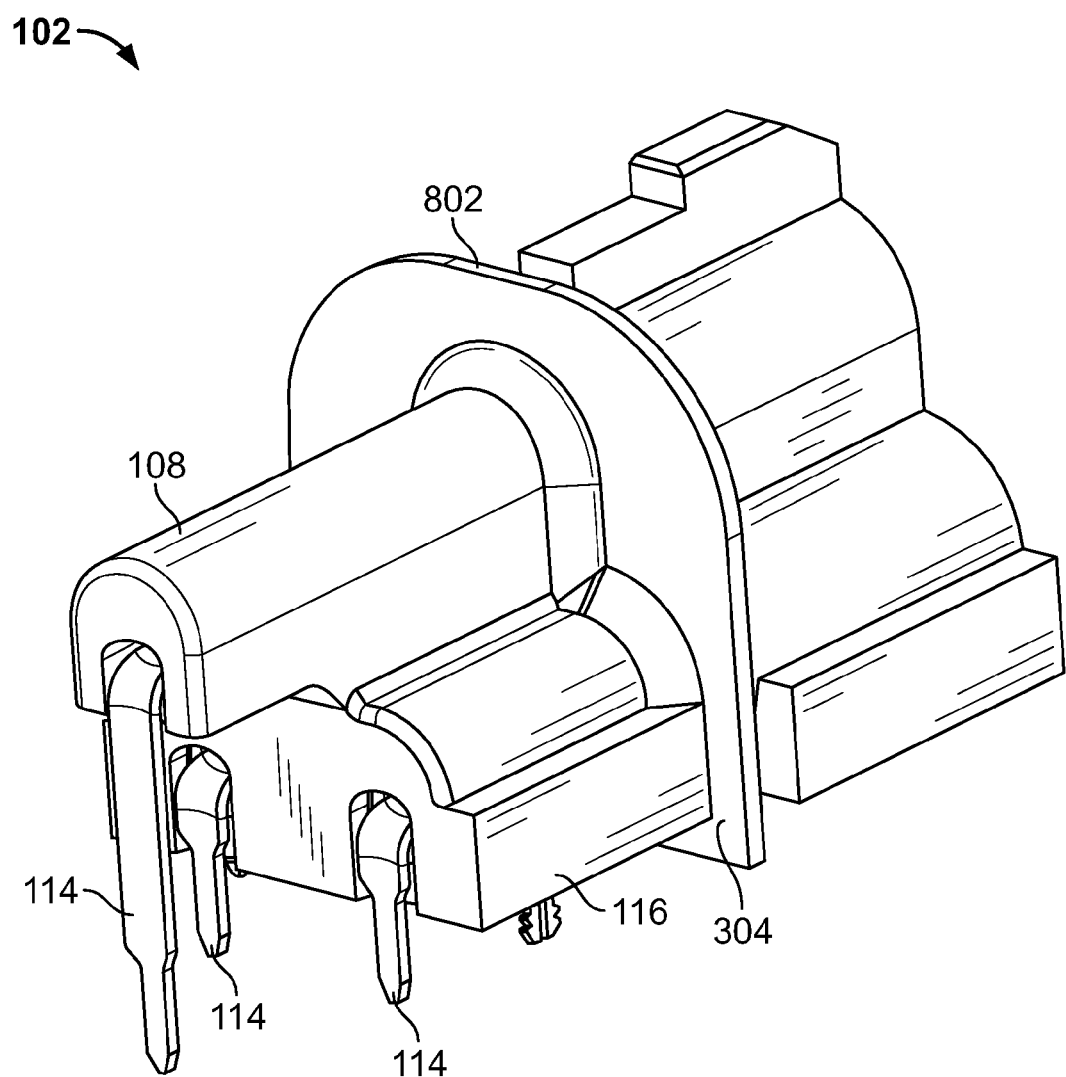
FIG. 9 illustrates a top reverse perspective view of an exemplary embodiment of a connector.

FIGS. 8 and 9 illustrate an exemplary embodiment of the connector 102. As shown in FIG. 8, the connector 102 includes the receptacle end 106, the housing 108, the latching mechanism 110, the potting shield 112, the at least one conductor 114, and the stabilizing member 116. In the embodiment illustrated in FIGS. 8 and 9, the connector 102 may be positioned within the ballast 104 (not shown in FIGS. 8 and 9) on top of a PCB 118 (not shown in FIGS. 8 and 9). The receptacle end 106 of the connector 102 is specifically configured to mate with existing connectors. The potting shield 112 includes the substantially planar bottom surface 304 acting as an aligning edge and as a guiding means.

The embodiment illustrated in FIGS. 8 and 9 depicts the at least one conductor 114 including three conductors 114 extending from the receptacle end 106 through the housing 108 to beneath the housing 108 of the connector 102. In other embodiments, any number of conductors 114 may be included. As depicted in the embodiment illustrated in FIGS. 8 and 9, the stabilizing member 116 is a horizontal member of cuboid geometry configured to abut the PCB 118 and act as a means of preventing the connector 102 from becoming dislodged. In the embodiment illustrated by FIGS. 8 and 9, there is one stabilizing members 116 located at the bottom of the housing 108 configured to abut the ballast 104. In the embodiment illustrated by FIGS. 8 and 9, the stabilizing member 116 houses two of the conductors 114 and is integral with the housing 108 of the connector 102. As mentioned above, another function of the stabilizing member 116 is that the stabilizing member 116 partially protects the conductors 114 from being damaged. The stabilizing member 116 depicted in FIGS. 8 and 9, provides this protection by acting as a physical barrier housing two of the three conductors 114. In the embodiment depicted in FIGS. 8 and 9, the stabilizing member 116 does not provide the same protection of the third conductor 114. Although not further described, other embodiments including features and elements described above may be included in the embodiment illustrated in FIGS. 8 and 9.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A connector comprising:
    a housing including a potting shield, the potting shield being a physical barrier configured to prevent potting inserted into the ballast from exiting out of the ballast;
    at least one conductor configured to extend through the housing; and
    wherein the housing is configured to be mounted to a PCB, the PCB being configured to be positioned in the ballast, thereby permitting the at least one conductor to extend through the PCB and through the ballast.

2. The connector in claim 1, wherein the housing further includes features selected from the group consisting of a latching mechanism, a receptacle end, a stabilizing member, and combinations thereof.

3. The connector in claim 1, wherein the housing is a polyamide molded housing.

4. The connector in claim 1, wherein the potting shield is a flange-like structure surrounding the housing and configured to abut a wall of the ballast when the connector is inserted into the ballast thereby sealing an opening in the ballast.

5. The connector in claim 1, wherein the potting shield includes an aligning edge.

6. The connector in claim 1, wherein the latching mechanism is apart from the potting shield thereby creating a slot permitting a portion of a wall of the ballast to slide between the locking mechanism and the potting shield.

7. The connector in claim 1, wherein the latching mechanism is configured to mate with a latch on a corresponding connector.

8. The connector in claim 1, wherein the receptacle end is configured to house at least one contact that is in electrical communication with the at least one conductor, wherein the receptacle end is configured to mate with a corresponding connector thereby permitting the connector to be in electrical communication with the corresponding connector.

9. A method of connecting a connector comprising a housing including a potting shield, the potting shield being a physical barrier configured to prevent potting inserted into a ballast from exiting out of the ballast, and at least one conductor configured to extend through the housing, the method comprising:
    mounting the housing to a PCB;
    positioning the ballast thereby permitting the at least one conductor to extend through the PCB and through the ballast;
    positioning the potting shield of the connector in the ballast;
    inserting the potting into the ballast; and
    preventing the potting inserted into the ballast from exiting out of the ballast.

10. The method in claim 9, wherein the housing comprises a latching mechanism, a receptacle end, and a stabilizing member.

11. The method in claim 9, wherein the housing is a polyamide molded housing.

12. The method in claim 9, wherein the potting shield is a flange-like structure surrounding the housing and configured to abut a wall of the ballast when the connector is inserted into the ballast thereby sealing an opening in the ballast.

13. The method in claim 9, wherein the potting shield includes an aligning edge.

14. The method in claim 10, wherein the latching mechanism is apart from the potting shield thereby creating a slot permitting a portion of a wall of the ballast to slide between the locking mechanism and the potting shield.

15. The method in claim 10, wherein the latching mechanism is configured to mate with a latch on a corresponding connector.

16. The method in claim 9, wherein the PCB is positioned in the ballast and configured to be secured by potting.

17. The method in claim 9, wherein the ballast is a ballast for fluorescent lighting applications.

18. The method in claim 9, wherein the connector can be connected or disconnected to a corresponding connector by an individual using a single hand.

19. A connector assembly comprising:
a housing including a potting shield, the potting shield being a physical barrier configured to prevent potting inserted into the ballast from exiting out of the ballast;
at least one conductor configured to extend through the housing;
a corresponding connector;
a PCB configured to be positioned in a ballast; and
wherein the housing is configured to be mounted to the PCB thereby permitting the at least one conductor to extend through the PCB and through the ballast.

20. The connector assembly in claim 19, wherein a stabilizing member is configured to abut the PCB and is configured to be affixed to the PCB by means of surface mounted hold-downs.

21. The connector assembly in claim 19, wherein the PCB is positioned in the ballast and configured to be secured by potting.

22. The connector assembly in claim 19, wherein the ballast is a ballast for fluorescent lighting applications.

23. The connector assembly in claim 19, wherein the connector can be connected or disconnected to a corresponding connector by an individual using a single hand.

* * * * *